Nov. 14, 1944. N. H. PARDOE 2,362,923
RATCHET HINGE FOR VEHICLE DOORS
Filed Dec. 9, 1941 2 Sheets-Sheet 1
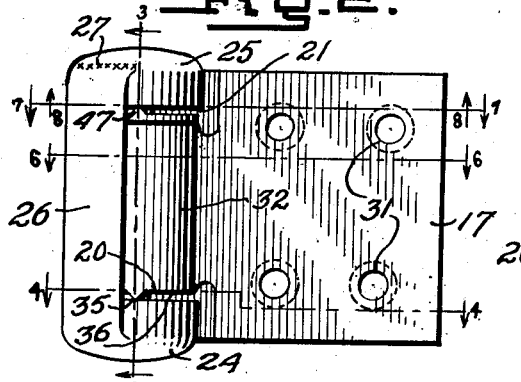
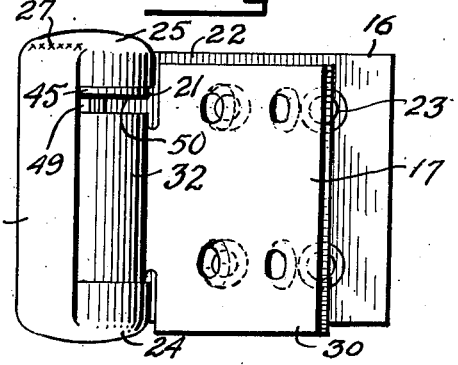
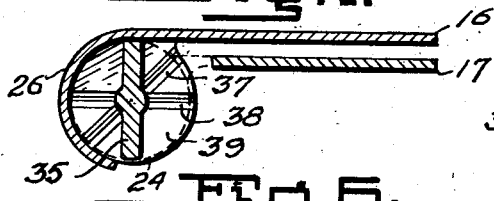
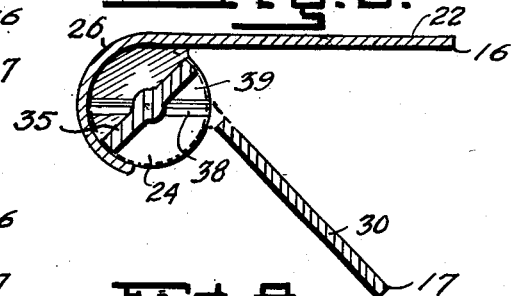
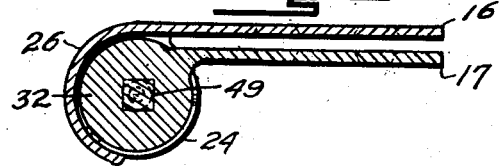
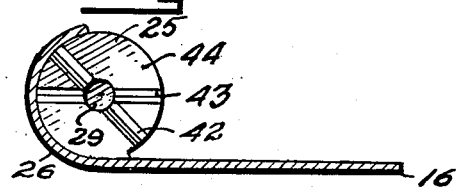
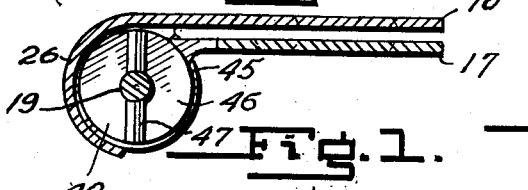
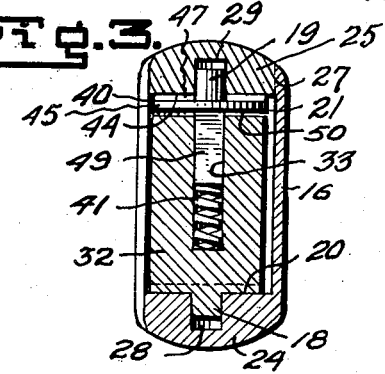
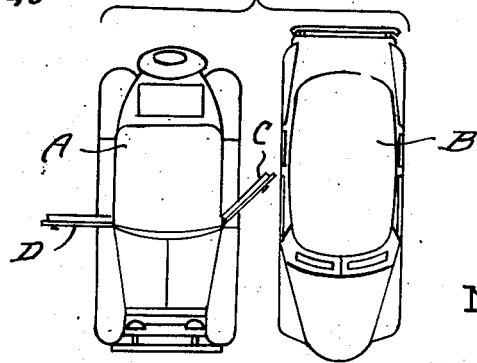
INVENTOR.
Norman H. Pardoe
BY
ATTORNEYS.

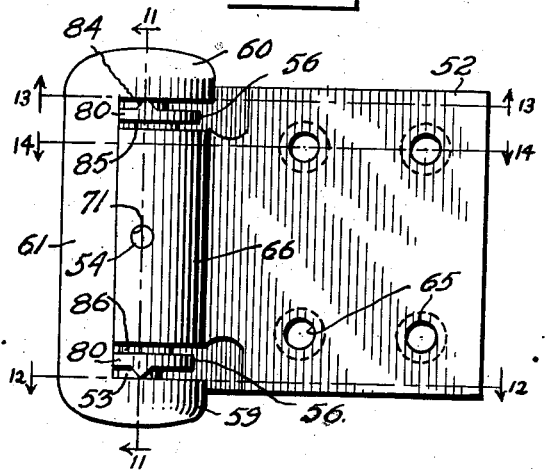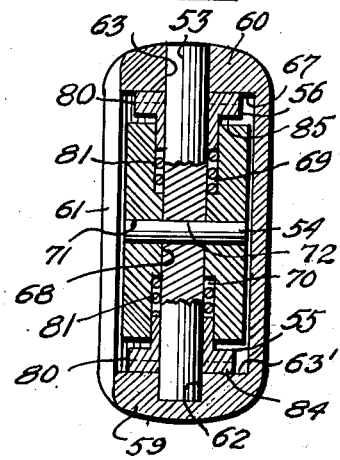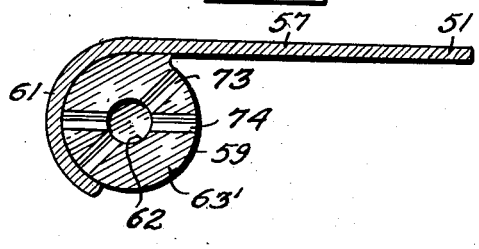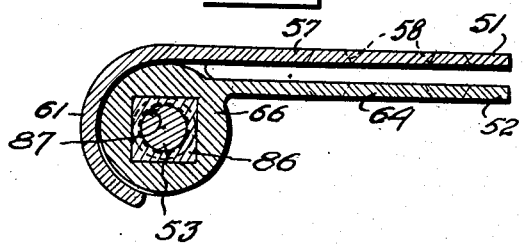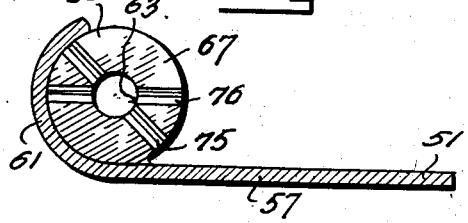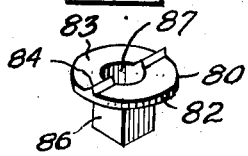

Patented Nov. 14, 1944

2,362,923

UNITED STATES PATENT OFFICE 2,362,923

RATCHET HINGE FOR VEHICLE DOORS

Norman H. Pardoe, Lusby, Md.

Application December 9, 1941, Serial No. 422,289

6 Claims. (Cl. 16—141)

The present invention relates to hinges for vertically hung vehicle body doors, and has for one of its principal objects the provision of ratchet hinges which tend to avoid damage to the doors of the vehicle equipped with them and damage to vehicles standing alongside the vehicle thus equipped when the doors are opened, as, for example, when vehicles are parked side by side in garages or parking lots and the doors are opened for entrance or exit of persons; and, accidents to persons entering or leaving the vehicle equipped with the hinges, due to wind forces, or the force of gravity when the vehicle is standing on an inclined road or other surface, and where the doors with ordinary hinges tend to swing to a closed position, likely to injure the legs or clothing of persons entering or leaving the vehicle.

Another object of the invention is to provide ratchet hinges which do not detract from the appearance of the vehicle, and which in outward appearance may resemble the ordinary vehicle door hinges now in common use.

A further object of the invention is to provide ratchet hinges which are low in cost of manufacture, sturdy in construction, and susceptible of substitution for the ordinary vehicle door hinges without tooling the body jamb or door, but by simply removing the screws or bolts used in holding the ordinary hinges in place, and using them to secure the ratchet hinge in operative relation to the jamb and door.

A still further object of the invention is to provide ratchet hinges which will remain operative as hinges even tho the ratchet mechanism becomes defective.

Other objects and advantages of the invention will appear in the following detailed description of two forms of hinges constructed according to my invention, taken in connection with the accompanying drawings, forming a part of this specification, and in which drawings:

Figure 1 is a plan view showing the manner in which the ratchet hinges tend to avoid damage to the vehicle equipped with them and a vehicle adjacent thereto or damage to property or person above referred to.

Figure 2 is an elevation of one form of ratchet hinge, in a closed position, looking toward the face of one of the hinge leaves.

Figure 3 is a vertical sectional view on the line 3—3 of Figure 2.

Figure 4 is a horizontal section on the line 4—4 of Figure 2.

Figure 5 is a similar view to Figure 4 but showing one hinge leaf swung to a plane at substantially 45° to the plane of the other hinge leaf.

Figures 6, 7 and 8 are horizontal sectional views on the lines 6—6, 7—7 and 8—8, respectively, of Figure 2.

Figure 9 is a view similar to Figure 2 but showing the position of one of the hinge leaves corresponding to that shown in Figure 5.

Figure 10 is a view in elevation of a modified form of ratchet hinge, looking toward the face of one of the hinge leaves, with the hinge in a closed position.

Figure 11 is a vertical sectional view on the line 11—11 of Figure 10.

Figures 12, 13 and 14 are horizontal sectional views on the lines 12—12, 13—13 and 14—14, respectively, of Figure 10.

Figure 15 is a perspective view of a ratchet member.

In the drawings, A and B designate automobiles parked side by side, the vehicle A being shown with its doors C and D open for entrance or exit of driver and passenger, and if equipped with ratchet hinges constructed according to the present invention, the hinges will yieldably resist swinging movement of the doors from the position shown, that is, the door C swung to a plane at substantially 45° to the plane of the door opening, where it will not touch vehicle B, and the door D swung to a plane at substantially 90° to the door opening where it will remain, even tho subjected to considerable wind force tending to close it, or if the vehicle is headed up an incline, will not close due to the force of gravity.

Referring first to the form of invention shown in Figures 2–9, where the weight of the door is materially used to render the ratchet effective, the hinge comprises a first hinge member 16 and a second hinge member 17 adapted to be attached to the vehicle body and door, respectively, in any usual or preferred manner; pintle of trunnion means 18 and 19, pivotally connecting the first and second hinge members; and, ratchet means 20 and 21 to yieldably resist free swinging movement of the second hinge member with respect to the first hinge member when the former has been swung from a closed position to substantially ⅛ and substantially ¼ turn.

The first hinge member 16 comprises a hinge leaf 22, which in the example shown is provided with screw or bolt receiving openings 23; pintle bearings 24 and 25; and an arcuate guard wall 26 which gives a streamlined effect to the hinge, conceals some of the working parts of the ratchet mechanism, and prevents removal of the door when locked, if the pintle means is broken.

It is preferred to form the hinge leaf 22, bearing 24 and wall 26 of one piece, and secure the bearing 25 in place, such as by welding as indicated at 27.

The pintle bearing 24 is preferably in the nature of a step bearing, being provided with an upwardly opening recess 28, to receive pintle means 18, while the bearing 25 is provided with a downwardly opening recess 29 to receive the pintle means 19. In this way the parts of the hinge may be assembled in such a manner that it is impossible to drive the pintle means from the hinge and no parts of the hinge are apt to be lost or misplaced while transporting or handling same.

The second hinge member 17 comprises a hinge leaf 30, which in the example shown is provided with screw or bolt receiving openings 31, and a knuckle 32 of a height considerably less than the distance between the companion pintle bearings 24 and 25, and of a radius slightly less than the radius of the inner face of arcuate guard wall 26. The knuckle is provided with an upwardly opening polygonal way 33 to receive parts of the ratchet means 21 as hereinafter described.

In order that the weight of the door C or D may be used to render ratchet means 20 effective, such means comprises one or more radially disposed, substantially V-shaped projections or pawls 35 formed integral with, or secured to the lower end 36 of knuckle 32 adapted to fit in either of two or more substantially V-shaped recesses 37 and 38 formed in the upper face 39 of lower pintle bearing 34. The recesses 37 and 38 are radially disposed with respect to recess 28 and are spaced apart substantially 45°. They are located such that when the hinge is closed, the projection or pawl 35 is spaced substantially 45° from the nearest of these recesses, in the example shown that designated 37, as shown in Figure 4. When the hinge is closed, the second hinge member 17 is supported upon bearing 24 by the projection or pawl 35 riding upon the upper face 39 of bearing 24. However, if the hinge assumes a ⅛ open position, as shown in Figure 5, the projection or pawl 35 will fall into its companion recess 37, as shown in Figure 5, and the lower end 36 of the knuckle 32 will then rest upon the upper surface 39. This causes a slight drop in the second hinge member, as shown in Figure 9, and thus the weight of the door may be used to render the ratchet means 20 effective. It is understood that if the hinge is further opened to a ¼ turn of the second hinge member with respect to the first hinge member, the projection or pawl 35 will fall in its other companion recess 38.

The pintle or trunnion means 18 is preferably formed integral with knuckle 32, while the pintle or trunnion means 19 is preferably carried by a part of the ratchet means 21.

Ratchet means 21 preferably comprises a carrier 40, an expansion spring 41, and at least two V-shaped recesses 42 and 43, formed in bearing 25 and open to the lower face 44 thereof, radiating from recess 29 therein. The carrier 40 preferably includes a horizontally disposed disc portion 45, from the upper face 46 of which the pintle or trunnion 19 extends, as well as at least one substantially V-shaped projection or pawl 47, radiating from the trunnion 19; and a polygonal stem 49 extending from the opposite face 50 of disc portion 45, the stem being co-axial with the trunnion. The stem 49 telescopes in way 33 of knuckle 32, with spring 41 interposed between the lower end of the stem and the bottom of the way, the spring exerting an upward pressure upon the stem. The projection or pawl 47 corresponds to the projection or pawl 35 on the knuckle, and the recesses 42 and 43 correspond to the recesses 37 and 38 in trunnion bearing 24. The stem 49 is in effect keyed to the knuckle 32, so as to rotate therewith, but is movable vertically so as to permit the projection or pawl 47 to move into either recess 42 or 43, according to the position of the door when opened thru an arc of 45° or an arc of 90°.

From the foregoing it is apparent that when the door is in a closed position, the projections or pawls 35 and 47 engage the confronting faces 39 and 44 of the bearings 24 and 25, respectively. Upon opening the door to an angle of 45°, the projection or pawl 35 will drop into recess 37, permitting the door to descend slightly, and the projection or pawl 47 will be forced into recess 42 thus yieldably resisting free swinging movement of the door from substantially the position shown in Figure 1 at the right side of vehicle A. If it is desired to swing the door to a 90° position, a certain amount of force must be applied to the door to raise it slightly as the projection or pawl 35 is moved out of recess 37, and when the door reaches the 90° position, shown in Figure 1 to the left of vehicle A, the projection or pawl 35 will descend in recess 38, while the pawl or projection 47 will spring upwardly into recess 43, thus yieldably resisting free movement of the door against wind forces tending to close it, or the force of gravity, if the vehicle is headed up an incline.

Referring now to the form of invention shown in Figures 10-15, showing a form where the weight of the door is not materially used to render the ratchet effective, the hinge comprises a first hinge member 51 and a second hinge member 52 adapted to be attached to the vehicle body in any suitable or preferred manner; a pintle 53; means 54 to cause the pintle to rotate with the second hinge member; and ratchet means 55 and 56 to yieldably resist free swinging movement of the door when it is substantially ½ open or fully open, corresponding to the 45° and 90° position previously mentioned.

The first hinge member 51 comprises, in the example shown, leaf 57 provided with screw or bolt receiving openings 58; lower and upper pintle bearings 59 and 60, respectively, and an arcuate guard 61. In this form, all of these parts may be formed integral, it being preferred to provide a recess 62 open to the upper surface 63' of bearing 59, for the lower end portion of pintle 53 and a thru way 63 in bearing 60, co-axial with recess 62, to receive the upper end portion of the pintle.

The second hinge member 52 preferably comprises a hinge leaf 64, provided with screw or bolt receiving openings 65, and a knuckle 66. This knuckle is of a height considerably less than the distance between the confronting faces 62' and 67 of the bearings 59 and 60, respectively, and is provided with a central way 68, circular in cross section, larger upper and lower ways 69 and 70, polygonal in cross section; and a central transverse way 71.

Pintle 53 is provided with a central transverse way 72 and when the pintle is in place, received by bearings 59 and 60, and extending thru way 68, the means 54, in the nature of a pin, may be driven thru the ways 71 and 72 thus compelling the pintle to rotate with knuckle 66, and also preventing the pintle from being readily removed.

The bearing 59 has at least two substantially V shaped recesses 73 and 74 open at its face 63 and radiating from recess 62, for cooperation with ratchet means 55, while the bearing 60 is provided with similar recesses 75 and 76 open to its lower face 67 and radiating from way 63. The recesses 75 and 76 are for cooperation with ratchet means 56. These recesses 73 and 74 as well as 75 and 76 correspond as to position and other characteristics, with the recesses 37 and 38, and 42 and 43, respectively, as described in connection with the form of invention shown in Figures 1 to 9 inclusive.

Each ratchet means 55 and 56 comprises a carrier 80 and an expansion coil spring 81, and each carrier 80 preferably comprises a horizontally disposed disc portion 82 on one face 83 of which is at least one substantially V-shaped projection or pawl 84 extending radially thereof; and extending from the opposite face 85 there is provided a polygonal stem 86. Extending thru the carrier is a vertical way 87, thru which the pintle 53 extends. The stem 86 of ratchet mechanism 55 is received in way 70 and projection 84 normally bears upon face 63' of bearing 59. The coil spring 81 of ratchet mechanism 55 is accommodated in way 70 and tends to force the carrier 80 downwardly so that the projection 80 will fit in either recess 73 or 74 according to the position of the door when opened. The stem 86 of ratchet mechanism 56 is accommodated in way 69 and its projection or pawl 84 normally bears upon the face 67 of bearing 60. The coil spring 81 of ratchet mechanism 56 tends to force the carrier 80 upwardly so that its projection or pawl 84 may spring into either recess 75 or 76 of bearing 60 according to the position of the vehicle door when open.

The operation of the form of hinge shown in Figures 10–15 is similar to the form previously described, with the exception that the vehicle door is not lowered when in one of the positions shown in Figure 1.

While the forms of invention herein shown disclosed are of the type where portions of the hinge are exposed to view when the door is closed, the principle of the invention may be embodied in the concealed type of hinges used on vehicles having streamlined bodies.

I claim:

1. A ratchet hinge for vehicle body doors, comprising a first hinge member including spaced upper and lower axially aligned pintle bearings provided, in their confronting faces, each with two substantially V-shaped recesses radiating from the common axis of said bearings, and located substantially 45° apart, a second hinge member including a knuckle interposed between said pintle bearings, pintle means normally securing said first and second hinge members together, means causing said knuckle and pintle means to rotate together when said second hinge member is oscillated, and ratchet means carried by each the upper portion and the lower portion of said knuckle, each ratchet means rotatable with the knuckle and movable toward and from its respective pintle bearing, and each ratchet means provided with a substantially V-shaped projection adapted to fit into either of said recesses of its respective pintle bearing, said V-shaped projections normally located, when the hinge is closed, at substantially 45° to the nearest of its respective companion V-shaped recesses, means carried by said knuckle for guiding said ratchet means for cooperation with its respective companion V-shaped recesses, said ratchet means including a spring normally urging said ratchets toward their respective pintle bearings.

2. A hinge for a vertically-hung vehicle door, comprising a first hinge member including spaced upper and lower axially-aligned pintle bearings provided, in their confronting faces, each with two recesses radiating from the common axis of said bearings; a second hinge member including a knuckle integral therewith, interposed between said bearings and having a transverse way; pintle means including a pintle having a transverse way, and a pin normally securing said hinge members together; said knuckle being provided with ways opening into its upper and lower ends surrounding and spaced from the pintle means; and ratchet means carried by each of the upper and lower portions of said knuckle and slidable along said pintle means toward and away from its respective pintle bearing, each ratchet means provided with a projection adapted to fit into either of said recesses in its respective pintle bearing, and each ratchet means including a stem, slidable and non-rotatable in said ways, one stem being in a portion of one way and the other stem being in a portion of the other way, and an expansion coil spring for each ratchet means also in each way and bearing against the bottom of the adjacent stem.

3. A hinge for a vertically-hung vehicle door, comprising a first hinge member including spaced upper and lower axially-aligned pintle bearings provided, in their confronting faces, each with two recesses radiating from the common axis of said bearings; a second hinge member including a knuckle integral therewith and interposed between said bearings; a pintle; means, associated with said knuckle and pintle, fixedly securing said hinge members together; said knuckle being provided with ways opening into its upper and lower ends surrounding and spaced from the pintle means; and ratchet means carried by each of the upper and lower portions of said knuckle and slidable along said pintle means toward and away from its respective pintle bearing, each ratchet means provided with a projection adapted to fit into either of said recesses in its respective pintle bearing, and each ratchet means including a stem, slidable and non-rotatable in said ways, one stem being in a portion of one way and the other stem being in a portion of the other way, and an expansion coil spring for each ratchet means also in each way and bearing against the bottom of the adjacent stem, said pintle means extending thru and outwardly of said ways, said ratchet means surrounding portions of said pintle.

4. A hinge for a vertically-hung vehicle door comprising a first hinge member including a first leaf portion, said member having spaced upper and lower axially aligned pintle bearings, one bearing having a recess and the other a way both axially aligned, with recesses in the confronting faces of said bearings, radiating from said way and first named recess, said member also having an arcuate guard integral with said bearings extending from said leaf portion and spacing apart said bearings and a second hinge member including a second leaf portion and a knuckle interposed between said bearings and partly surrounded by said guard, said knuckle having a transverse way and a longitudinal way, said transverse way being so disposed that when said leaf portions are facing each other, as when a vehicle door is normally closed, one mouth of said transverse way will face and be closely adjacent said first named leaf portion; a pintle extending thru said longitudinal way and from either end of said knuckle and into said first-named recess and first-named way, said pintle having a transverse way aligned with said first named transverse way; a pin snugly accommodated in said transverse ways; and ratchet means interposed between said pintle bearings and knuckle, each having pawls facing its nearest pintle bearing, adapted to enter any of the radiating recesses of the nearest pintle bearing, said last named means arranged to yieldably resist free movement of the hinge members only when one is swung relative to the other and said pawls are in said radiating recesses.

5. A ratchet hinge for vertically hung vehicle doors comprising a first hinge member including spaced upper and lower axially aligned pintle bearings having faces confronting one another, and an arcuate guard wall integral with and extending between siad bearings concentric with the axis of said bearings; a second hinge member including a knuckle interposed between said pintle bearings, the length of said knuckle being less than the shortest distance between said confronting faces, said knuckle and the spaces between the ends of said knuckle and inner ends of said pintle bearings being partially surrounded by said guard wall at all times, pintle means carried by said knuckle, said pintle means having a length less than the shortest distance between the uppermost face of said upper pintle bearing and the lowermost face of said lower pintle bearing, the end portions of said pintle means being rotatably supported by said pintle bearings; and ratchet means interposed between said pintle bearings and knuckle, arranged to yieldably resist free movement of the hinge members only when one hinge member is swung relative to the other hinge member from a closed position to substantially ⅛ and substantially ¼ turn.

6. A ratchet hinge for vertically hung vehicle body doors comprising a first hinge member including spaced upper and lower axially aligned pintle bearings provided, in their confronting faces, each with two substantially V-shaped recesses radiating from the common axis of said bearings, and located substantially 45° apart, a second hinge member including a knuckle interposed between said pintle bearings, pintle means movably securing said first and second hinge members together including pintle ends extending into said pintle bearings, and disposed in non-projecting relationship wtih the upper outer surface of said upper pintle bearing and in non-projecting relationship with the outer surface of said lower pintle bearing, means causing said knuckle and pintle means to rotate together when said second hinge member is oscillated, and a ratchet means carried by each the upper portion and the lower portion of said knuckle, each ratchet means including a pawl for cooperation with the said V-shaped recesses of its adjacent pintle bearing; means carried by said knuckle for guiding at least one of said ratchet means for cooperation with its respective companion V-shaped recesses, said pawl being normally located, when the hinge is closed, at an angle of substantially 45° to the nearest of its respective companion V-shaped recesses.

NORMAN H. PARDOE.